(12) United States Patent
Colmant et al.

(10) Patent No.: US 8,009,702 B2
(45) Date of Patent: *Aug. 30, 2011

(54) METHOD AND ARRANGEMENT FOR LOCAL SYCHRONIZATION IN MASTER-SLAVE DISTRIBUTED COMMUNICATION SYSTEMS

(75) Inventors: Michel Colmant, Erlenbach (CH); Alan Benner, Poughkeepsie, NY (US); Francois G. Abel, Rueschlikon (CH); Michel Poret, Valbonne (FR); Norbert Schumacher, Neuhausen (DE); Alain Blanc, Vence (FR); Mark Verhappen, Langnau am Albis (CH); Mitch Gusat, Adiswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/777,439

(22) Filed: May 11, 2010

(65) Prior Publication Data
US 2010/0220749 A1 Sep. 2, 2010

Related U.S. Application Data

(63) Continuation of application No. 10/512,671, filed on Aug. 4, 2005, now Pat. No. 7,720,105.

(30) Foreign Application Priority Data

Apr. 30, 2002 (EP) .................................... 02009738

(51) Int. Cl.
*H04J 3/06* (2006.01)
(52) U.S. Cl. ........................................ 370/503; 370/389
(58) Field of Classification Search .................. 370/509
See application file for complete search history.

(56) References Cited

U.S. PATENT DOCUMENTS

2003/0002539 A1* 1/2003 Soda et al. .................... 370/509

* cited by examiner

*Primary Examiner* — Kwang B Yao
*Assistant Examiner* — Syed M Bokhari
(74) *Attorney, Agent, or Firm* — Michael J. Buchenhorner; Vazken Alexanian

(57) ABSTRACT

A communication system which consists of several modules—operating in parallel on segments of a packet—to increase speed and handling capacity. One module acts as master, the others are slave modules controlled by control signals derived by the master module. It is important that in each module the data segment and the respective control signal of each packet are correctly synchronized, because in large systems the data paths carrying packet segments and the control signal paths may have substantially different delays. The invention provides for measurement of the propagation delay differences and for introducing a controlled delay in each slave module, so that data segments and control signals can be correctly correlated by delaying either the one or the other. Synchronization packets are transmitted besides normal data packets, for obtaining time stamps which are used to determine the delay difference.

8 Claims, 7 Drawing Sheets

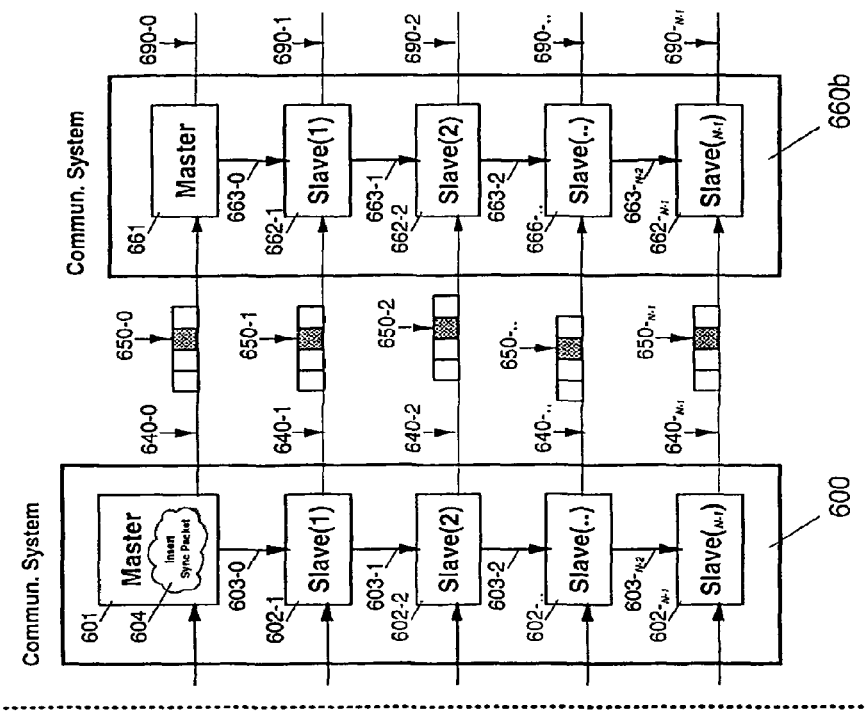
Fig. 6b
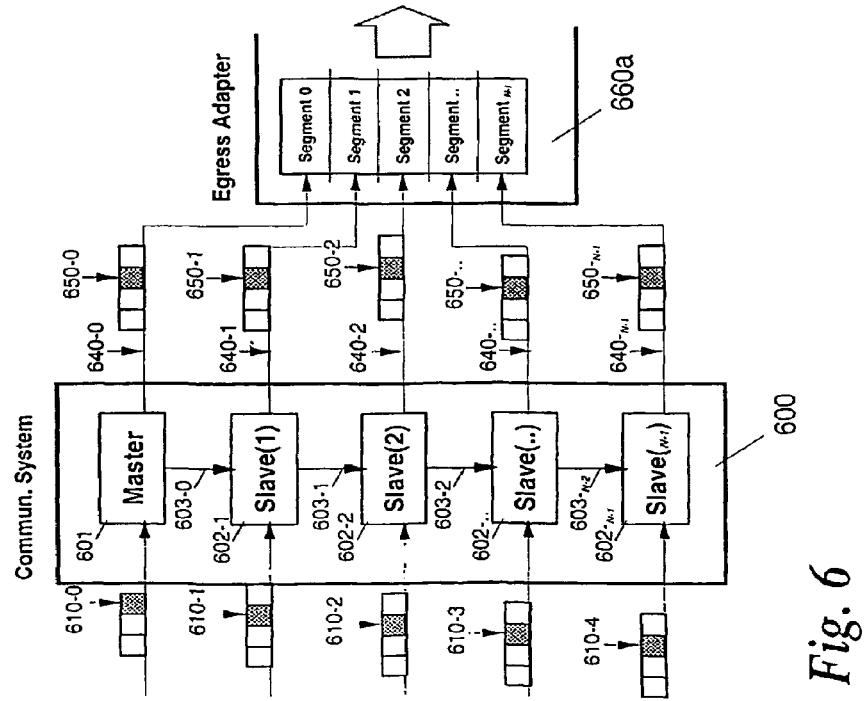
Fig. 6a
Fig. 6

METHOD AND ARRANGEMENT FOR LOCAL SYCHRONIZATION IN MASTER-SLAVE DISTRIBUTED COMMUNICATION SYSTEMS

CROSS-REFERENCE TO RELATED APPLICATIONS

This application is a continuation of, and claims priority from, commonly-owned, co-pending U.S. patent application Ser. No. 10/512,671, filed on Mar. 31, 2003, which application is cross-referenced with, and claims priority from, International Patent Application PCT/IB2003/01227 filed on Apr. 30, 2002, and published in English with Publication No. WO2003/094446 on Jul. 24, 2003, under PCT article 21(2), which in turn claims priority of EP 02009738.2, filed on Apr. 30, 2002.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The present invention relates to packet handling technology in electronic communication networks and the design structure of the processing arrangements used therefor. More particularly it refers to a method and apparatus for synchronizing multiple processing elements (or modules) operated in parallel, to form the equivalent of a single processing arrangement with aggregate throughput equal to the sum of the combined aggregate throughput of multiple parallel processing elements. A typical application of this invention is in packet switching systems.

BACKGROUND OF THE INVENTION

Among all the competing requirements put on the switch fabric designs of the current generation, scalability of number of ports and cost-effectiveness are two fundamental issues that should be addressed. Two ways to build a cost-effective and scalable switch fabric are distinguish. The first option is the widely adopted single-stage switch architecture which is very efficient but has scalability limits because of its quadratic complexity growth (as a result of linear growth of the number of ports). The second option is the multistage switch architecture which provides higher throughput by means of more parallelism, but which is generally more complex and less efficient than single stage switches.

A multistage switch architecture is also referred to as a Multistage Interconnection Network (MIN), i.e., a fabric arrangement of "small" single-stage switching modules interconnected via links in multiple stages or mesh-like in such a way that switching and link resources can be shared by multiple connections resulting in a complexity growth smaller than $N^2$, typically in the order of N log N, where N is the total number of ports of the switch fabric. Although it is recognized that MINs are needed to obtain very high throughput and support for large number of ports, their common introduction has been repeatedly postponed over the last decade. A reason is that continuous new innovations in single-stage switching system design together with new opportunities created by advances in underlying technologies were able to keep pace with the market requirement increases over the same period. Also, within their range of scalability, single-stage switching architectures remain very attractive as they provide the most cost- and performance-effective way to build an electronic packet switch network.

Single-stage switch architectures can be classified into two types: architectures with centralized control and architectures with distributed control. The latter type consists of parallel switching domains, each having an independent scheduler (control domain). Its main drawback is that it requires some complexity overhead incurred by load balancing and reordering algorithms that handle the packets distributed over the multiple switch domains. In the literature, this is also referred to as Parallel Packet Switching (PPS). On the other hand, the switch architecture with centralized control only has one switch domain which usually consists of several switch slices operated in parallel. Operating multiple switch slices in parallel enables an increase in switch port speed and thus allows to build a switching core with higher speed. This approach is used in a number of single-stage switches as it allows to build systems handling large numbers of external links by multiplexing them onto a single link of higher speed. For a given circuit technology, there is a limit to the applicability of this technique, but within its applicability range it offers the most cost-effective way to scale to larger sized switches. Other reasons that make the single-stage switch designs based on centralized control approach very popular, are the singularity of its scheduling scheme and its ability to implement any queuing structure: shared-memory-based output-queued structure, crossbar-based input-queued structure or combined input-output-queued structure.

The problem concerned with the present invention applies to switch architectures with centralized control. The aim is to provide a means to improve their inherent growth limitation. This is done by facilitating the aggregation of multiple switch elements and have them operated in parallel in a so-called Port Speed Expansion mode. This improvement also indirectly applies to MIN architectures as they are usually composed of single-stage switching modules.

In the computer community, data and pipeline parallelism have long been exploited to achieve higher bandwidth. When applied to packet switching technology in electronic networks, this translates into packets being switched over multiple parallel slices, and is sometimes referred to as Port Speed Expansion.

An early description of port speed expansion can be found in an article by W. E. Denzel, A. P. J. Engbersen, and I. Iliadis, entitled "A flexible shared-buffer switch for ATM at Gb/s rates", published in Computer Networks and ISDN Systems, Vol. 27, No. 4, January 1995, pp. 611-624. In this paper, port speed expansion is used to expand the port rate in a modular fashion by stacking multiple slaves chips and have them controlled by a single-master chip.

A particular port speed expansion embodiment applied to an output queued switch architecture is also described in the European patent application EP0849917A2.

The problem concerned with the present invention is now in more detail the following. A well known difficulty of port speed expansion is the complexity of its implementation due to the fact that master and slave modules have to be tightly synchronized. At high port rate, this leads to complex and/or expensive synchronization logic which usually limits the physical degree of parallelism and thus the maximally achievable throughput. Therefore there is a need to decouple the scalability of a port speed expansion scheme from its implementation complexity incurred by synchronization issues.

In a switch fabric core operated in port speed expansion mode, the component switches are termed as either "Master" or "Slave" switch. A port speed expanded switch fabric contains one Master, and one or more Slaves components. Master and Slaves may be connected in any arbitrary topology such as a chain, a ring, or a tree. The general concept of port speed expansion is now described/recalled with reference to FIG. 1 which illustrates an example related to the prior art commercial product IBM PRS64G where only one Slave is used. The PRS64G is a packet routing switch that implements 32 input and 32 output ports, each running at 2 Gb/s, for a total aggregate bandwidth of 64 Gb/s. Combining two of these chips in port speed expansion mode enables to operate the physical ports at 4 Gb/s and to build a switch fabric with twice the aggregate bandwidth (128 Gb/s). When a packet to be switched is received by the ingress fabric interface it is split into several parts, termed here "Logical Unit" (LU) (or later also termed "Segment"). In this particular example, the number of LU's equals the number of component switches, but this is not a prerequisite. Next, the ingress fabric interface sends one LU of each packet to the Master switch, and the following LU to the Slave switch. The first LU contains only part of the initial packet payload but it has the full packet header which includes handling information. The second LU, which is passed to the Slave, contains only payload information and no routing information. The Master handles its LU according to the routing and Quality-of-Service information carried by the packet header, and then informs the Slave about its scheduling decision by sending an appropriate (derived) control information to it. For every LU received by the Master, a derived control information is sent to the Slave over a so-called ingress port speed expansion bus. Likewise, when the Master schedules a packet to be transmitted, a similar control information is sent to the Slave over an egress port speed expansion bus. Because of the propagation delay of the egress control path, the master egress LU may actually leave earlier than the slave egress LU. In some cases, an additional transmit synchronization mechanism may be needed between the Master and the Slave, if the two outgoing LU's are required to reach the egress fabric interface at nearly the same time. From the description above, it is obvious that a port speed expanded fabric calls for control of the propagation delays and a precise match of two different flows, namely: the data flow from ingress fabric interface toward fabric core and egress fabric interface (drawn horizontally in FIG. 1) and the control flow from master to one or multiple Slaves (drawn vertically in FIG. 1). Given the packet duration example of FIG. 1 (128 ns for a 64 Bytes packet) and the compactness of the switch fabric core (built on a single-board), this was easily achieved by ensuring that the control information reaches the Slave within one packet cycle of 128 ns, which is ample of time for a single board design in the current technology.

Meanwhile, because of continuous increase in data link rates and system sizes, speed expanded systems have gotten progressively more and more difficult to build. On one side, the faster data link rates have caused packet durations to decrease but have required higher degree of parallelism in the port speed expansion implementations. On the other side, bigger system sizes have forced designers to distribute the switch fabric over multiple boards and racks, thus increasing link distances for data flows and/or control flows within the fabric. Given all these more strict system requirements and sizes, it gets very difficult and/or expensive to precisely control and match the propagation delays between elements which are physically distributed and for which packet durations have decreased at the same time. In particular, it may occur that the multiple LU's from one packet may not arrive at the Master and one or more Slave switches at the same or close to the same time. In fact, it may occur that LU's from completely different packets arrive at the Master and/or the Slave switches at the same or nearly the same time.

Assuming a chain based topology example of 1 Master and N−1 Slaves as depicted in FIG. 2, a possible solution is to provide each Slave with a means to measure the latency of the control path at system initialization time, and to insert a digital programmable delay into the data path of each Slave that compensates and matches the propagation delay of the control path. Measurement of the control path latency is done relative to a synchronization signal broadcast by the Master to all Slaves. Once the latency of the control path has been measured by each Slave, the digital programmable delay of the data path is set accordingly and individually within each Slave, so that the control and data path delays match on a packet cycle basis. Although this proposal goes in the right direction, it solves only half of the problem as it is not able to compensate for different latencies in the port speed expanded data paths (see Data Path Skew in FIG. 2). In fact, the proposed scheme only works if the system is rather tightly synchronized, such that all LU's sent by the ingress fabric interface reach the fabric core within a skew window which is less than a packet cycle duration. At a port rate in the order of 10 Gb/s (OC192), this may be achievable if the number of ports allows the physical fabric size to be built in a compact way of say a single electronic rack. For systems of larger dimensions and higher port rates such as 40 Gb/s (OC768), the local synchronization method not only should compensate for latency of the control path but should also compensate for the unpredictable skew in the propagation paths of both data and control information, and this for any (arbitrary) topology. Also, in order to be easily scalable, the method should be able to relax the synchronization constraints incurred by the port speed expansion concept.

SUMMARY OF THE INVENTION

Generally, the objective of this invention is to provide a method and apparatus to achieve local synchronization of data and control information at each module of a distributed master-slave communication system of arbitrary topology. Synchronization is achieved by compensating the unpredictable skew in the propagation paths of data and control information. The magnitude and sign of each compensation is determined by sending synchronization packets through the communication system.

Another objective is to provide a means to locally and independently measure the propagation delay difference between the data and the control paths at every synchronization point of the distributed system. This local measurement allows to cope with the inherent speed scalability limits of distributed communication systems with centralized control, by enabling the system to operate in a locally synchronous but globally asynchronous fashion. The advantage of this scheme, as opposed to a global synchronization scheme of a master and multiple slaves, is that the centrally controlled system can be scaled to operate with higher degree of parallelism, arbitrary number of slaves and arbitrary topology. In particular, it allows to build plesiochronous systems that operate different modules with slightly different frequencies of slowly varying phases, which is usually the case in large distributed systems.

In accordance with the present invention, there is provided a communication system for processing data packets each including a header with control information and a data payload. The system comprises an ingress port for receiving the data packets, in which ingress port each data packet is subdivided into segments. The system further comprises a master unit and one or more slave units for parallel processing of the segments. The master unit is adapted to receive the header from each packet via a data path and the one or more slave units are adapted to receive data segments via a data path. Via a control path derived control information is passable from the master unit to the one or more slave units. In the system are synchronization providing means provided for sending synchronization packets also subdivided into segments from the ingress port through the system over the same paths as normal data packets, and for passing synchronization control information through the system over the same paths as normal derived control information. Each of the one or more slave units comprises time shift information means, also referred to as first means, for obtaining, when a synchronization packet segment and its corresponding synchronization control information are received, time shift information representing the propagation delay difference between the data path and the control path. Each of the one or more slave units comprises delay means, also referred to as second means, for delaying either a data segment or derived control information, in response to the time shift information obtained by the time shift information means.

In accordance with a second aspect of the present invention, there is provided a communication arrangement for processing data packets each including a header with control information and a data payload, comprising an ingress port for receiving the data packets, in which ingress port each data packet is subdivided into segments, comprising a communication system with a master unit and one or more slave units for parallel processing of the segments, the master unit is adapted to receive the header with control information from each packet via a data path and the one or more slave units are adapted to receive data segments via a data path; and wherein derived control information is passed from the master unit to the one or more slave units via a control path, in which arrangement means, also referred to as synchronization providing means, are provided for sending synchronization packets also subdivided into segments from the ingress port through the system over the same paths as normal data packets, and for passing synchronization control information through the system over the same paths as normal derived control information, each slave unit comprises first means for obtaining, when a synchronization packet segment and its corresponding synchronization control information are received, time shift information representing the propagation delay difference between the data path and the control path, and each slave unit comprises second means for delaying either a data segment or derived control information, in response to the time shift information obtained by the first means.

In accordance with a third aspect of the present invention, there is provided a method for local synchronization in a master-slave communication system designed for processing data packets each comprising a header with control information and a data payload and each receivable through at least one ingress port, in which system each data packet is subdivided into segments in the ingress port for parallel processing of the segments;

the system comprising a master unit and one or more slave units for parallel processing of the segments; wherein the master unit receives the header with control information from each packet and the one or more slave units receive data segments via a data path; and wherein derived control information is passed from the master unit to the one or more slave units via a control path; the method comprising the following steps, for ensuring correct correlation between received data segments and derived control information in the slave units despite differing propagation delays in the data path and the control path:

(a) sending a synchronization packet, also subdivided into segments, from the ingress port through the system over the same paths as normal data packets, and passing a synchronization control information derived from the header of the synchronization packet, through the system over the same paths as normal derived control information;

(b) obtaining in the one or more slave units, when a synchronization packet segment and its corresponding synchronization control information are received, time shift information representing the propagation delay difference between the data path and the control path; and (c) in the one or more slave units, compensate for the propagation delay difference, represented by the time shift information obtained in step (b), by delaying for each received packet segment either the packet segment itself or the derived control information.

A particular advantage of this invention is that its synchronization scheme is locally self-adaptive and that it can be made robust. Self-adaptive means that the synchronization process is performed locally and autonomously at every synchronization point of the distributed system, and that no bi-directional communication is required between neither module of the communication system. Robustness to varying delays of data and/or control paths can be achieved by sending the synchronization packets multiple times through the system, for example at regular intervals.

A further advantage of this invention is that, since the master/slave segments can compensate for skew between packet segments, the ingress adapter source is not required to transmit all packet segments simultaneously. In fact, it is advantageous for it to send the packet segments transmitted to the master and the slaves at a time delayed by the time required for the previous master/slave on the control path to forward the control information to the following slave in the path plus the difference between the data path skew of those consecutive segments on the control path. Doing this decreases the amount of buffering required on the data path of the slaves to compensate for the control path latency. This advantage holds for single-stage systems or the first stage of a multistage communication system.

The advantage of the relaxed synchronization constraints per stage give more design freedom for the master plane in both, single- and multistage systems because the master plane is now temporally independent from the self-adapting slave planes. The advantage of local synchronization in multistage systems is that no extra latency is added by each stage, which would be the case if each stage were globally synchronized. Because multistage communication systems are also physically larger than single-stage systems (in identical technology), relaxed synchronization constraints become more important for such systems because the larger system may span multiple boards/shelves/racks that are connected through longer links. With ever increasing bandwidth/faster packet transmission times, the decoupling of synchronization constraints from packet lengths is an important advantage.

BRIEF DESCRIPTION OF THE SEVERAL
VIEWS OF THE DRAWINGS

The present invention is illustrated by way of examples and is not limited by the shape of the figures or the drawings in which:

FIG. 6 is a block-diagram representing schematically the transmission of multiple data packets from the egress side of a segmented communication system to an egress adapter (FIG. 6a) or to another segmented communication system in the case of a multistage configuration (FIG. 6b).

DETAILED DESCRIPTION

Figure 3:
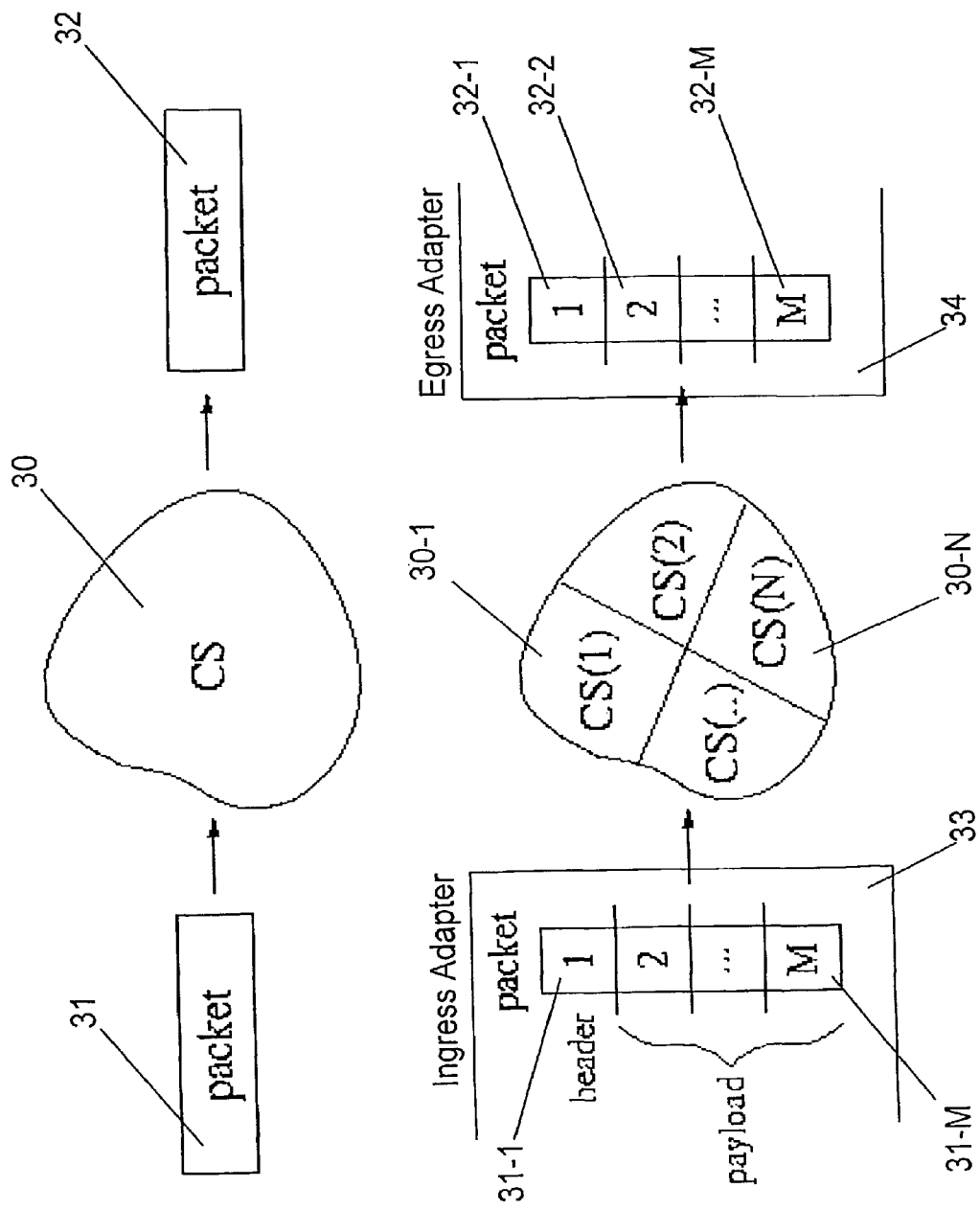
FIG. 3 is a general schematic overview of a packet communication system (CS) and the corresponding segmented packet communication system which can be improved by the present invention.

With general reference to the figures and with special reference now to FIG. 3, a general communication system 30 that transports data entities, hereafter called packets, is considered. Beyond certain stringent requirements of size or performance, parallelism is sometimes the only feasible solution in any given technology.

Parallelism can be achieved by partitioning and distribution of the system. The combined functionality of the distributed parts 30-1 to 30-N, is identical to the functionality of the original system 30. Therefore a packet 31 is also partitioned (into segments) and transported through the communication system by processing different parts of the packet in different parts of the system. Partitioning of the system and the packet is depicted in the lower part of FIG. 3. A typical example of such a parallel system is the case where M=N and each segment of a packet is processed by a corresponding part of the communication system.

Segmentation of the incoming packets is assumed to be done by an external device 33, hereafter called ingress adapter. Similarly, re-assembly of the outgoing packet segments is also assumed to be done by an external device 34, hereafter called egress adapter.

There are several ways to segment and distribute the functionalities of a communication system as mentioned in the introduction. The problem concerned with the present invention applies to distributed communication systems with centralized control, which is sometimes referred to as a master-slave class of system.

Figure 2:
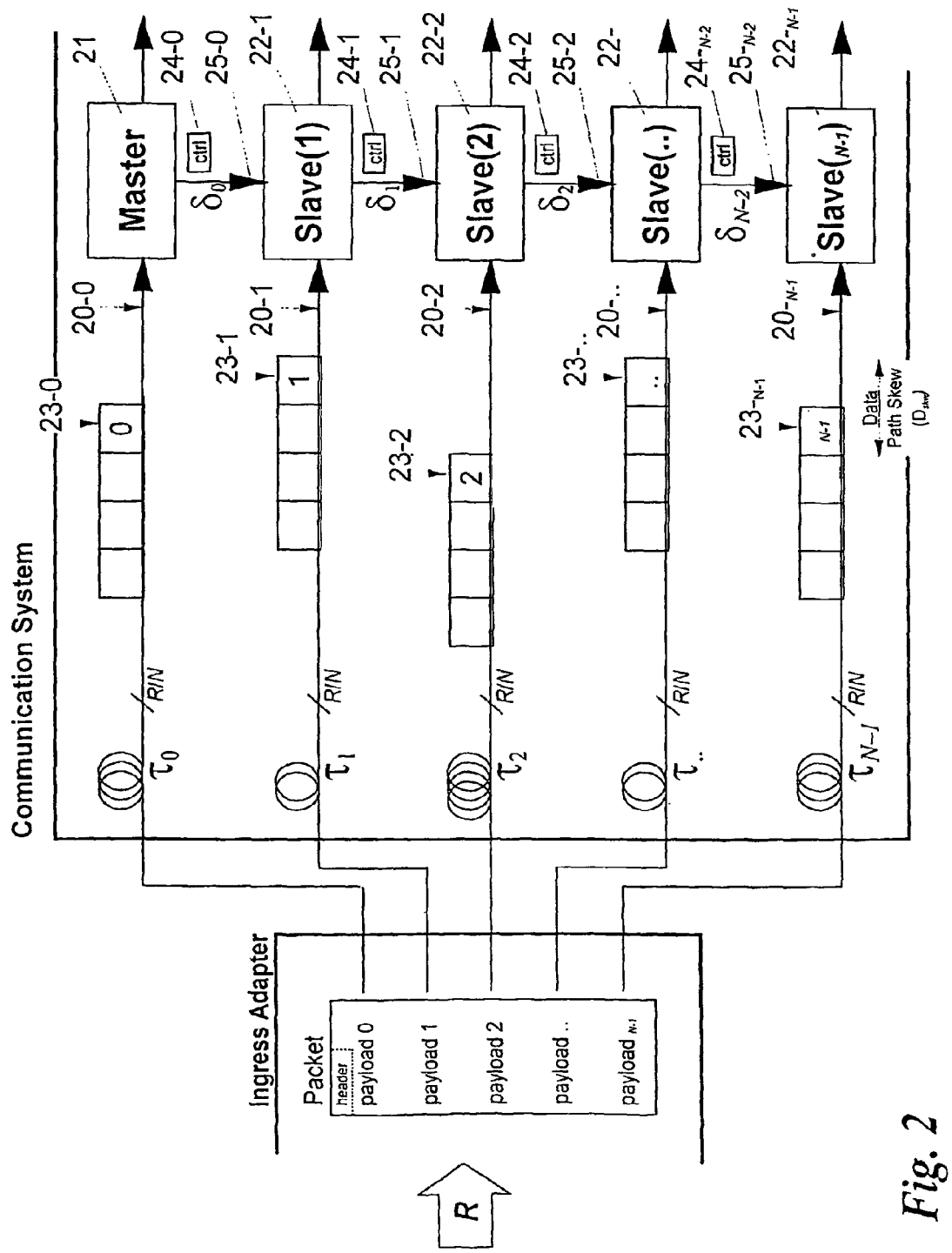
FIG. 2 is a block diagram representing schematically the transmission of multiple data packets from an ingress source to a segmented communication system which is (arbitrarily) organized into a chain topology of 1 master and N−1 slaves.

A master-slave class of system may be connected in any arbitrary topology such as a chain, a ring, a tree, or any combination of these three topologies. With reference now to FIG. 2, the ingress behavior of a distributed communication system with centralized control is explained relative to a chain based topology, which is one possible embodiment among many others.

A key attribute of a distributed communication system with centralized control is that its internal links can operate at much lower rate than the incoming external line rate. Assuming an external line rate R, a communication system can be composed of multiple (say N) modules operated in parallel, resulting into individual module links being operated at rate R/N.

Incoming packets are partitioned by an ingress adapter into N identical segments before being sent over N different links or connections 20-0, 20-1, . . . , 20-$_{N-1}$, each operating at rate R/N. The first segment containing the packet header (and possibly also payload) is sent to a master module 21, whereas the N−1 other segments containing only data payload are transmitted to a first, second, and further slave modules 22-1 to 22-$_{N-1}$. The highest achievable degree of parallelism is dictated by the size of the header which must entirely fit into a single segment. Therefore N cannot be greater than size of the packet divided by size of the header. In the maximal expansion mode, the first segment does not carry any payload.

Although all segments are sent at the same time by the ingress adapter, different segments will experience different propagation times $\tau_0$ to $\tau_{N-1}$, depending on the topology and the length and quality of the links. Therefore, the N segments 23-0 to 23-$_{N-1}$ of a given packet will generally not arrive at the master and the slaves at the same or close to the same time. The difference between the fastest and the slowest propagation time defines the data path skew window which is assumed to be normalized to a packet cycle time for sake of simplicity. It is also clear that for communication systems of very high bandwidth and/or large size, multiple packet segments from consecutive packets may be in flight over every single link or connection 20-0 to 20-$_{N-1}$.

When the master module 21 receives the segment 23-0 it extracts the header information and handles the segment according to the routing and Quality of Service (QoS) information (handling information) carried by the header. Next or possibly at the same time, a control information 24-0 hereafter called derived control information, is generated and transmitted to the slave module 22-1 over a control interface 25-0. The derived control information 24-0 informs the first slave module 22-1 about the control decision(s) made by the master module 21 and contains information required by the first slave module 22-1 to handle its incoming segment 23-1. Therefore and similarly to the data links 20-0 to 20-$_{N-1}$, there will be multiple entities of derived control information in flight over an interface 25-$k$ ($0 \leq k \leq N-2$).

In the chain-based topology assumed by FIG. 2, the derived control information 24-0 received by the first slave module 22-1 is also forwarded to the second slave module 22-2 or the next in the chain and so on until the derived control information 24-$_{N-2}$ reaches the last slave module 22-$_{N-1}$. In a treelike topology, derived control information 24-0 could have been broadcast to all slaves at the time.

Back to the topology example of FIG. 2, all derived control information 24-0 to 24-$_{N-2}$ may also experience dissimilar propagation delays $\delta_0$ to $\delta_{N-2}$. In order for each slave to associate its segment 23-$i$ ($0 \leq i \leq N-1$) with the proper derived control information counterpart 24-$j$ ($0 \leq j \leq N-2$), a synchronization is useful between the data and control flows at each slave module 22-1 to 22-$_{N-1}$. This synchronization can be performed by introducing a programmable delay in the data and/or control paths, such that the differences between propagation delays of the paths can be compensated for. Practically, the compensation to be introduced by the first slave module 22-1 corresponds to the propagation delay $\delta_0$ of the derived control information 24-0, minus the difference in propagation time between the links 20-0 and 20-1: ($\delta_0-(\tau_0-\tau_1)$). The compensation for the second slave module 22-2, with respect to the derived control information sent by the master module 21, corresponds to $((\delta_0+\delta_1)-(\tau_0-\tau_2))$, while it is $((\delta_0+\delta_1+\ldots+\delta_{N-2})-(\tau_0-\tau_{N-1}))$ for the last slave module 22-$_{N-1}$ in the chain.

In order to introduce a programmable delay in the data and/or control paths of each slave module 22-1 to 22-$_{N-1}$, the propagation delay difference is measured, i.e. time shift information representing this difference is obtained, and then the locally required compensation delay is computed. The latter is described in more detail below. It should be noticed that for the sake of coherence with the problem description above, the description remains in the context of a chain-based topology.

Figure 4:
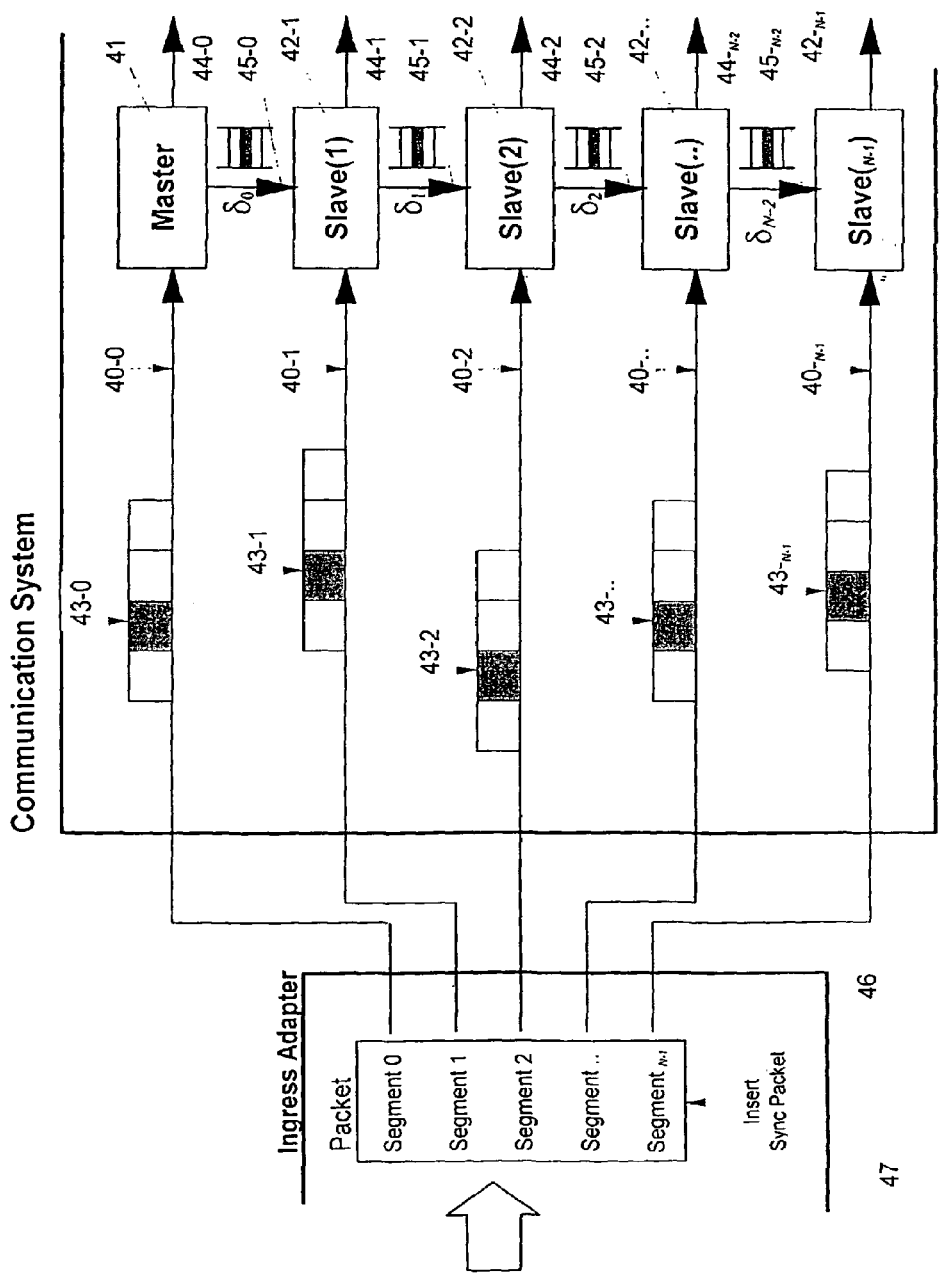
FIG. 4 is a block diagram representing schematically the transmission of synchronization packet segments and of control information derived from the segment of the synchronization packet the contains the header, in accordance with the invention.

With reference now to FIG. 4, a feature of the invention is to inject special synchronization packets, hereafter termed sync packets, into the communication system and to locally measure (inside each slave module) the propagation delay difference between the control and data flows. This is done by obtaining time stamps for the data path and the control path, which represent the time shift between the two paths. Sync packets are separately distinguishable from the normal data stream and are injected by the ingress adapter 46 under the control of a specific process 47. Sync packets are also split into segments 43-0 to 43-$_{N-1}$ which are in turn, distinguishable from the packet segments of normal data packets. In FIG. 4, this is indicated by the shaded packet segments.

The synchronization packets could be transmitted through the system periodically at regular intervals between normal data packets. But in certain cases it may be sufficient to send only one sync packet when the whole system is initialized, or to send packets (at irregular intervals) whenever it appears necessary.

When the master module 41 receives a sync packet segment 43-0 it generates a specific control information 44-0, hereafter called derived sync control information, which it transmits to the first slave module 42-1 over the control interface 45-0, similar to the transmission of normal (non-sync) derived control information related to a data packet. Derived sync control information is distinguishable from normal derived control information and is also shaded in FIG. 4.

Figure 5:
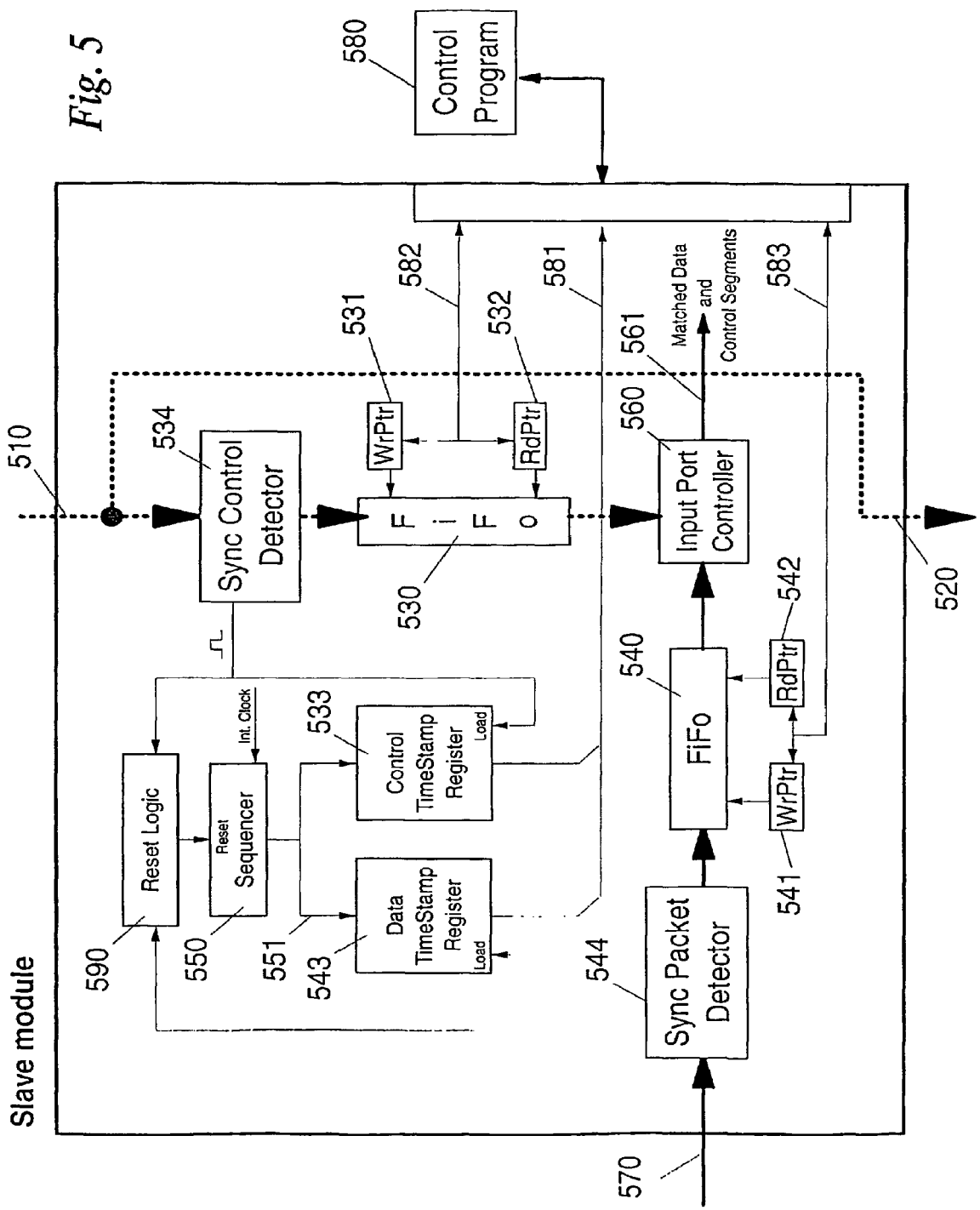
FIG. 5 is block diagram of a preferred embodiment of the invention.
Figure 7:
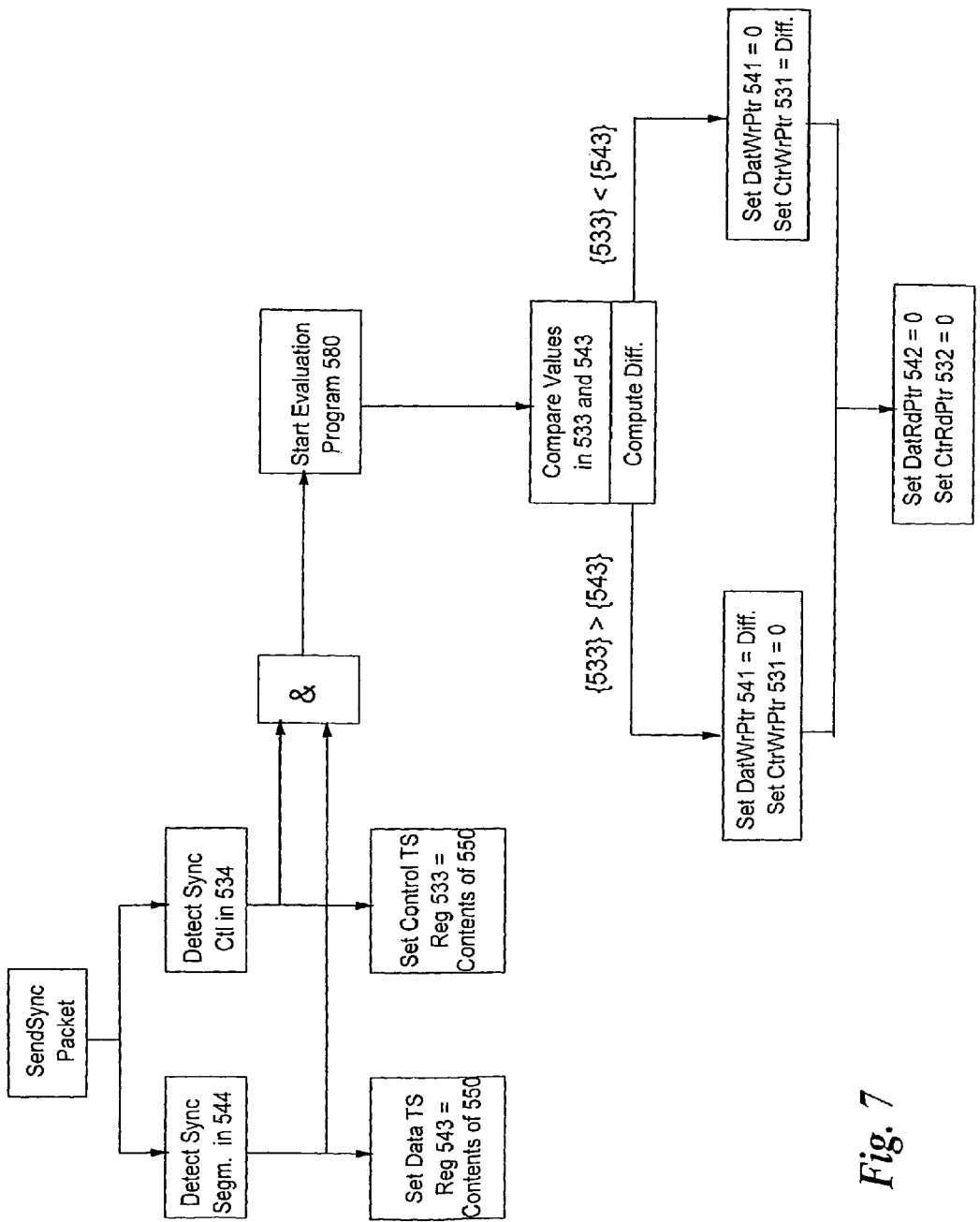
FIG. 7 is a flow diagram illustrating the synchronization procedure.

With reference to FIG. 5 and FIG. 7, matching of the data and derived control information within each slave module, is described according to a preferred embodiment.

When one slave module receives a derived control information over its ingress control interface 510, it does two things. First, it immediately forwards it over an egress control interface 520 to the next slave module in the chain. Secondly, it inspects the incoming control information with a sync control detector 534. If the incoming derived control information relates to a normal data packet, then it gets written into a first FiFo buffer 530. If the incoming derived control information is of type sync, it triggers the load of a control time-stamp register 533 with a sequence number provided by a sequencer 550 over a bus 551. In this preferred embodiment it is assumed that the derived sync control information gets also written into the first FiFo buffer 530, although this is optional.

The same kind of processing is applied to the incoming packet segments received over an ingress data interface 570. A sync packet detector 544 sorts out the normal data segments from the sync packet segments. Normal data packet segments are written into a second FiFo buffer 540, whereas sync packet segments are used to trigger the load of a data time-stamp register 543 with the sequence number also provided by the sequencer 550. If it was decided to write derived sync control information into the first FiFo buffer 530, then also sync packet segments are written into the second FiFo buffer 540.

The sequencer 550 is basically a counter that is continuously incremented by the internal clock of the slave module. This sequencer 550 can be forced to restart counting from zero after a specific reset command generated by a Reset Logic 590. This reset logic 590 generates a reset command upon the detection of the first arrival of either a sync packet segment or its corresponding derived sync control information by the detectors 544 and 534. The reset command causes the sequencer 550 to restart counting from zero.

After transmission of a sync packet, a control program 580 (usually common to all master and slave modules) is used to monitor the content of the data and control time-stamp registers 533 and 543 via the bus 581. This control program computes the difference between the content of the time-stamp registers and initializes a write pointer value 531 and 541 accordingly via respective buses 582 and 583. In this particular embodiment the FiFo's 530 and 540 are assumed to be used as circular shift registers, but it is clear that a person skilled in the art can easily come up with other approaches to implement a programmable digital delay. Operating the FiFo buffers 530,540 in a circular way, means that once they are enabled via the respective buses 582 and 583, both read and write pointers will start increasing (controlled by the internal clock) at the same time and that the distance between the write and read pointer will remain constant (under normal mode of operation, which means continuous flow of incoming data, idle and/or sync packets, and as long as no change in data and control path propagation delays is detected locally after receipt of a sync packet by the circuitry sketched in FIG. 5).

The setting of the read and write pointers is done in the following way. Read pointers 532 and 542 are always set to zero. The setting of the write pointers 531 and 541 is based on the numbers retrieved from the data and control time-stamp registers 533 and 543. If the control program 580 determines that the data segment is received in advance of its counterpart derived control information (i.e. $\{533\}>\{543\}$), then a delay is added into the incoming data path by initializing the data write pointer 541 with a value equal to the required delay. As the control path does not need to be delayed, the control write pointer 531 can be initialized with the same value as the read pointer, i.e. zero.

In the other case, when the control program determines that the control path is faster than the data path (i.e. $\{533\}<\{543\}$), then a delay is added into the control path by initializing the control write pointer 531 with the required delay and setting the data write pointer 541 to zero.

The required delay is equal to the (absolute value) of the difference between the contents of time stamp registers 533 and 543.

During normal mode of operation, content of the data and control time-stamp registers 533 and 543 can also be monitored by the control program 580 or any other hardware means implemented within the slave module, to check and verify that the distance between the two register values remains the same and that therefore the system remains synchronized. Another way to check that the system remains synchronized can be implicitly achieved inside an input port controller 560, when both, sync packet segments and derived sync control information, get written into the FiFo buffers 540 and 530. If this is the case, any sync packet segment read out of the second FiFo buffer 540 should always match with another derived sync control information read out of the first FiFo buffer 530 or the system is not synchronized anymore.

It is to be noted that the preferred embodiment is capable of delaying both the data and the control flows, even though it is expected that in most realistic applications, the control path will be the slowest path. The mechanism and the logic to compensate on the delay of the control flow is not required, if by design, the data path skew window $D_{skw}$ (defined as being the maximum of the data skews between any of the packet segments associated with a given packet) is always smaller than the latency of any of the control path between two consecutive slaves: $D_{skw} < \delta 0$, and $D_{skw} < \delta 1$, and . . . , and $D_{skw} < \delta_{N-2}$.

As mentioned earlier, sync packets can be sent either periodically at regular intervals (which would be normally the case), or it is possible to send only one sync packet in the beginning, or send sync packets on demand.

With reference to FIG. 2 again, the interval between transmission of the sync packets is determined by the ingress adapter to be at least as long as the longest possible latency in the control transmission path, plus the maximum possible size of the data path skew window:

$$((\max \delta 0 + \max \delta 1 + \ldots + \max \delta_{N-2}) + D_{skw})$$

All the numbers used to compute the minimum possible interval between transmission of two sync packets are easy to retrieve as they correspond to absolute maximum values given by design. On the other side, the only limit on the maximum possible interval between transmission of two sync packets, is given by the maximum sequence range addressable by the sequencer 550 and the length of the FiFo buffers 530, 540.

It is also clear that the upper requirement relates to the specific embodiment of FIG. 5 and that a person skilled in the art can easily imagine a further embodiment using another transmission rule for the sync packets.

With reference to FIG. 4 again, there are several methods for distinguishing sync packet segments 43-$i$ ($0 \leq i \leq N-1$) and derived sync control information 44-$j$ ($0 \leq j \leq N-2$) from the normal data packet segments and normal derived control information. A preferred method envisioned is by encoding the packets, and by using special coding, such as for example, the K-characters of the 8b/10b Fibre Channel/Ethernet/Infiniband code, to specifically distinguish the sync packets segments and the derived sync control information. Nevertheless, any other methods which clearly distinguish sync packets and derived sync control from other packets would work as well.

With reference to FIG. 6, the egress part of a distributed communication system with centralized control is described for two different cases. FIG. 6a shows a case where the communication system 600 is a single-stage system, or the last stage of a group of similar communication systems, and FIG. 6b shows a case where the communication system 600 is only one stage of an arrangement with plural stages, and where another system 660b follows as the next stage in the arrangement. Similar to the ingress side of the communication system 600, packets leaving the system are also partitioned into N identical segments and are sent over N different links or connections 640-0, 640-1, . . . , 640-$_{N-1}$, each operating at rate R/N. The first segment containing the packet header (and possibly also payload) is transmitted by the master module 601, whereas the N-1 other segments containing only data payload are transmitted by the slave modules 602-1 to 602-$_{N-1}$.

The egress part of the communication system 600 either connects to an egress adapter 660a which reassembles the outgoing data segments into a single packet (FIG. 6a), or to the ingress part of another communication system 660b in the case of a multistage interconnect configuration (FIG. 6b).

As different outgoing data segments will also experience different propagation times over the links 640-0 to 640-$_{N-1}$ (and also on the control path 663-0 to 663-$_{N-1}$ of the next stage in FIG. 6b), a synchronization process similar to the ingress side of the communication system is also used between the egress side of the communication system 600 and the next block connected to it, i.e. the egress adapter 660a and the next-stage communication system 660b. This implies that the communication system 600 generates and injects special synchronization packet segments 650-0, 650-1, . . . , 650-$_{N-1}$ which together represent one sync packet, over the links 640-0 to 640-$_{N-1}$, in order for the next stage to locally measure the propagation delay differences and to adjust them accordingly.

If the next stage is also a master-slave class of the communication system (FIG. 6b), then the sync packet segments 650-0 to 650-$_{N-1}$ generated by the egress side of the communication system 600 are used by the ingress side of the next stage 660b to achieve local synchronization of the data and derived control information, as described previously. If the next stage is an egress adapter (FIG. 6a), then the sync packet segments 650-0 to 650-$_{N-1}$ generated by the egress side of the communication system 600 are used to measure the relative arrival time between the multiple packet segments in order to recombine them into a single packet that can be further processed and/or forwarded.

In both cases (FIG. 6a and FIG. 6b) the egress side of the communication system 600 behaves as an ingress adapter for the next stage attached to it.

There are several methods for defining the injection time of the egress sync packets segments 650-0 to 650-$_{N-1}$. A preferred method is to derive the injection time from the incoming sync packet segments 610-0 to 610-$_{N-1}$, while another method would be to derive the injection time directly from a specific egress process 604.

The first option is most likely to be used by a bufferless system in which incoming packets are immediately forwarded to an output port without being stored. In that particular case, an egress sync packet segment can be generated whenever a sync packet segment and a derived control sync information match occurs into the input port controller 560 (FIG. 5).

On the other hand, if the communication system 600 is a buffered system, ingress and egress sync processes are most likely decoupled from each other. In that particular case the sync packet segments can be regenerated by the communication system itself if it implements a specific egress sync process 604. When this process triggers the injection of one sync packet, one sync packet segment 650-0 is generated by the master module 601 and transmitted over the link 640-0. At the same time, a derived sync control information, called derived egress sync control information, is also transmitted to all the slave modules 602-1 to 602-$_{N-1}$ over the control interface 603-0 to 603-$_{N-2}$. Within each slave module 602, the derived egress sync control information is then used locally to regenerate an egress sync packet segment to be transmitted over the links 640-0 to 640-$_{N-1}$. Another case that calls for decoupling the ingress and egress is when the delays on the egress control path differ from the delays on the ingress control path.

Figure 1:
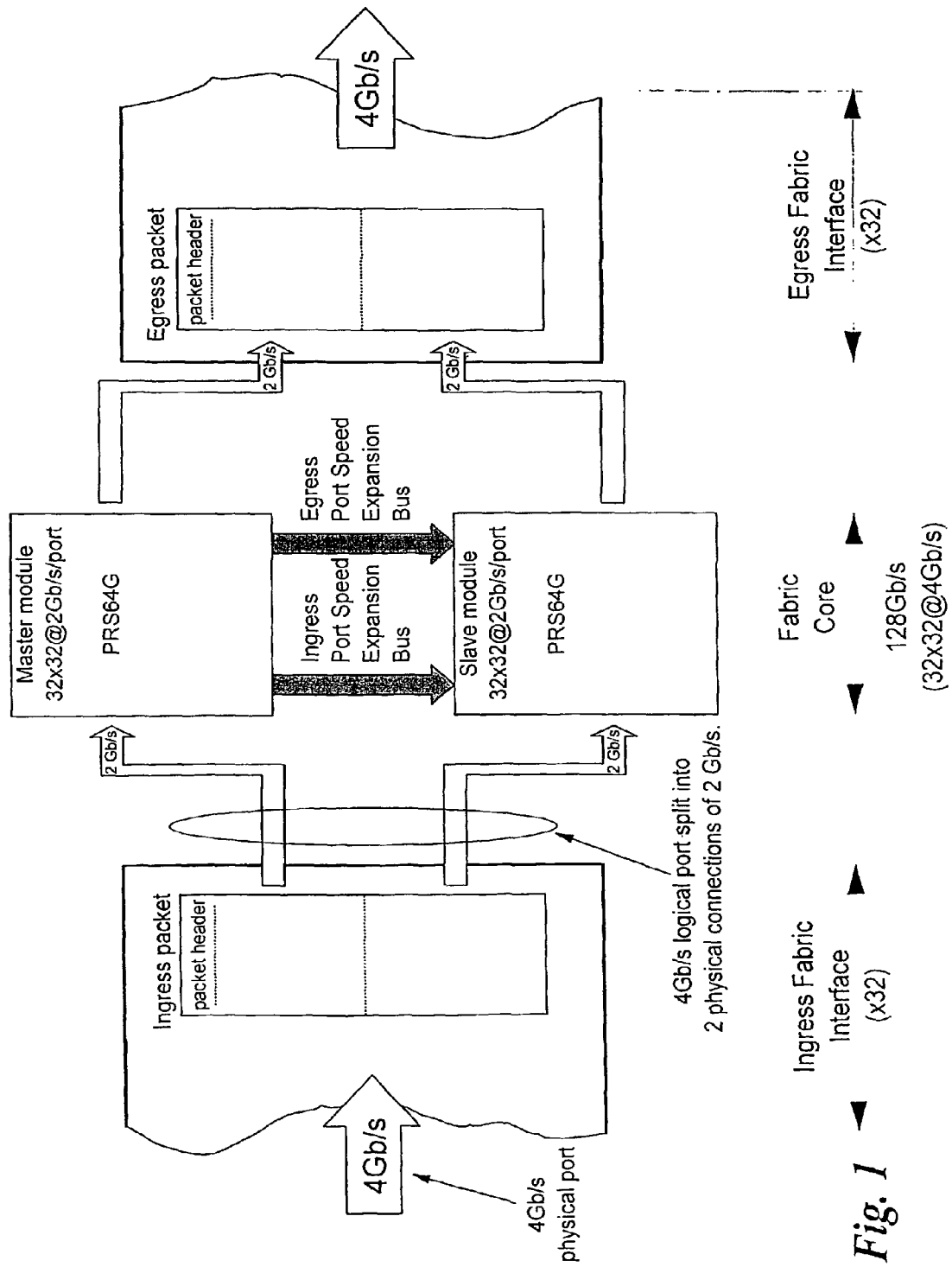
FIG. 1 is a block diagram of a prior art electronic switching system that implements the general concept of distributed master-slave communication system and port speed expansion.

It is to be noted that the FIGS. 2, 4 and 6 show a single control path from master to slaves. This does not exclude the possibility of having multiple distinct control paths. A typical example is depicted in FIG. 1, where ingress and egress control paths are separate.

Any disclosed embodiment may be combined with one or several of the other embodiments shown and/or described. This is also possible for one or more features of the embodiments.

The invention claimed is:

1. a non-transitory program storage device readable by machine, tangibly embodying a program of instructions executable by the machine for providing local synchronization in a master-slave distributed communication network designed for processing data packets, the program instructions comprising steps of: receiving data packets and sync packets, each data packet comprising a header containing control information, and a data payload; partitioning the data packets into N segments for parallel processing of N different segments in different parts of the system over N different links; sending a first segment comprising the header to a master unit; transmitting N−1 next segments containing only data payload to slave units; wherein N is not greater than a size of the data packet divided by a size of the header; and splitting the sync packets into sync packet segments and injecting the sync packet segments into a same path as the data packet segments.

2. The program storage device of claim 1, wherein the program instructions further comprise a step of reassembling the segments to form packets.

3. The program storage device of claim 1 configured to operate with at least two distributed communication systems, and further comprising program instructions for compensating propagation delay differences on the data paths between egress lines of the modules of a first distributed communication system and ingress lines of the modules of a second distributed communication system, and the control path.

4. a non-transitory program storage device readable by machine, tangibly embodying a program of instructions executable by the machine for providing local synchronization in a master-slave distributed communication network designed for processing data packets, the program instructions comprising steps of: in a master unit: receiving the header from each data packet segment; receiving the sync packet segment; generating derived sync control information; transmitting the derived sync control information to a first slave unit over a control interface; extracting header information and handling the segment according to the routing and quality of service information carried by the header; generating derived control information; and transmitting the control information to the at least one slave unit over the control interface; wherein the derived control information informs the at least one slave unit about the control decisions made by the master unit and contains info required by the first slave unit about the control decisions made by the master unit.

5. a non-transitory program storage device readable by machine, tangibly embodying a program of instructions executable by the machine for providing local synchronization in a master-slave distributed communication network designed for processing data packets, the program instructions comprising steps of: in a first slave unit for parallel processing of data segments, wherein the first slave unit is adapted to receive a data segment via a data path: using an ingress control interface for receiving derived control information, derived sync control information, and the data segments, wherein the derived control information comprises information about control decisions made by a master unit and contains information required by the first slave unit about the control decisions made by the master unit; and using an egress control interface for transmitting the derived control information to a next slave unit; using a sync control detector for: inspecting the incoming control information; triggering load of a control time-stamp register with a sequence number provided by a sequencer if the incoming derived control information is of type sync; locally measuring a propagation delay difference between the control and data flows by obtaining time stamps for the data path and the control path, which represent the time shift between the two paths, time shift information representing the propagation delay difference between the data path and the control path; delaying either a data segment or derived control information, in response to the time shift information obtained by the time shift information means; associating its segment with a corresponding derived control information counterpart by introducing a programmable delay in the data and/or control paths, such that the differences between propagation delays of the paths can be compensated for; and forwarding the derived control information received by the first slave unit to a next slave unit until the derived control information reaches a last slave unit; using an internal clock for continuously incrementing a counter; and using the sequencer comprising the counter to restart counting from zero after a specific reset command; and resetting the sequencer in response to one of: a first receipt of a synchronization packet segment and the corresponding derived synchronization control information.

6. The program storage device of claim 5, wherein the sync control detector comprises circular shift registers controlled by write and read pointers.

7. The program storage device of claim 5, wherein the sequencer further comprises:
  (a) a control time stamp register for storing contents of the sequencer when synchronization control information derived from the synchronization packet is received via the control path, and
  (b) a data time stamp register for storing the contents of the sequencer when a synchronization packet segment is received via the data path.

8. The program storage device of claim 5 wherein the sequencer further evaluates the contents of the time stamp registers in one of the one or more slave units, and determines the difference representing the time shift; and
  selectively activates a delay in either one of these delay means.

* * * * *